Aug. 18, 1964     J. SOPKO, JR     3,145,054
PORTABLE CHAIR SEAT WITH A BACK-SUPPORTING PNEUMATIC CUSHION
Filed July 12, 1962
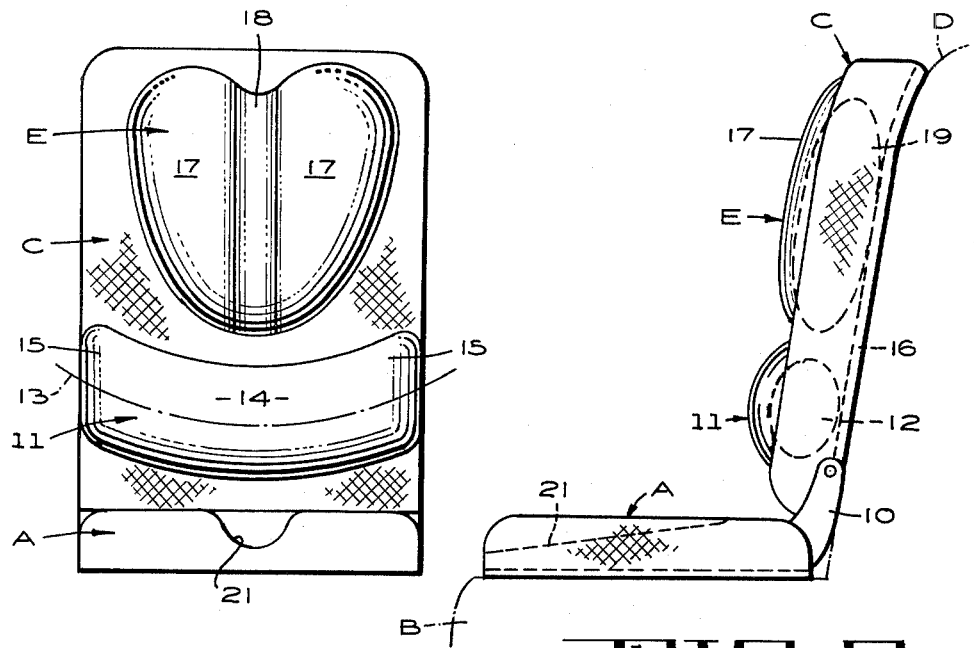
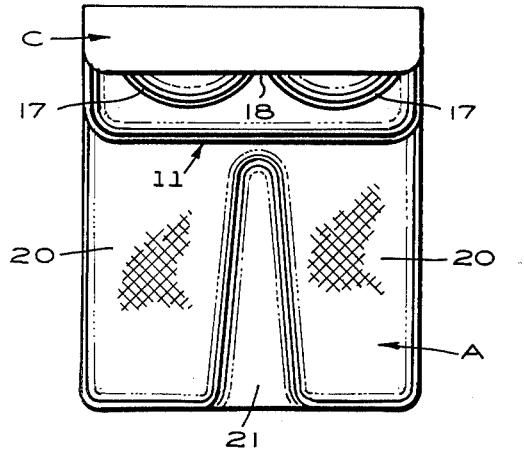
INVENTOR.
JOHN SOPKO, JR.
BY Joseph F. Cole
ATTORNEY

United States Patent Office 3,145,054
Patented Aug. 18, 1964

3,145,054
PORTABLE CHAIR SEAT WITH A BACK-SUPPORTING PNEUMATIC CUSHION
John Sopko, Jr., Rte. 3, Box 161, Sonora, Calif.
Filed July 12, 1962, Ser. No. 209,465
1 Claim. (Cl. 297—460)

An object of my invention is to provide a portable chair seat with a back-supporting pneumatic cushion that is adapted to embrace the sacroiliac region of an occupant occupying the seat and pressing rearwardly against the cushion. Moreover, the rebounding pressure of the cushion against the sacroiliac region of the occupant may be readily varied by forward and rearward movement of the occupant.

Another object is to provide a portable chair seat with a back-supporting pneumatic cushion that may be placed on the seat of an automobile or truck and used by the driver, although its use is not limited in this respect.

Other objects and advantages will appear as the specification proceeds. The novel features of the invention will be set forth in the annexed claims.

Drawing

For a better understanding of the invention, reference should be had to the accompanying drawing, forming part of this specification, in which:

FIGURE 1 is a front elevational view of my portable chair seat with a back-supporting pneumatic cushion;

FIGURE 2 is a top plan view thereof; and

FIGURE 3 is a side elevational view of the portable chair seat with a back-supporting pneumatic cushion, indicating it as resting on a conventional seat of an automobile.

While I have shown only the preferred form of my invention, it should be understood that various changes, or modifications, may be made within the scope of the appended claim without departing from the spirit thereof.

Detailed Description

Referring now to the drawing in detail, I have disclosed a seat designated generally at A which is adapted to be placed on a supporting surface B, for instance, the driver's seat of an automobile. A backrest C is secured to the seat A, and may be positioned against the back D, as indicated in FIGURE 3. Of course, the portable seat A and its backrest C may be supported on other surfaces, if desired.

It is preferable that the backrest C be attached by hinges 10 of the seat A so that the former may be folded over the latter to provide a compact unit for transportation and storage.

As an important structural feature, it will be noted that an elongated back-supporting pneumatic cushion 11 is carried by the backrest C to extend transversely thereof. This cushion may contain an air cell 12 (see FIGURE 3). As shown in FIGURE 1, the cushion 11 is curved along its longitudinal axis 13 to define concaved upper and convexed lower edges, respectively; and has its midportion 14 disposed at an elevation above the seat A in a position to embrace the sacroiliac region of an occupant occupying the seat A and pressing rearwardly against the cushion 11.

Moreover, the cushion 11 has its outer end portions 15 curving upwardly from its midportion 14 and being disposed at an elevation above the seat A in positions to support the floating ribs area of the occupant, when pressing rearwardly against the pneumatic cushion 11.

In FIGURE 3, a rigid member 16 has been arranged rearwardly of the cushion 11 and against which this cushion and its air cell 12 may be compressed by the occupant, whereby the rebounding pressure of the cushion 11 against the sacroiliac region and the floating ribs area of the occupant may be varied by forward and rearward movement of the occupant.

It will be observed that the backrest C may be provided with an upper pneumatic cushion E having two bulged lobes 17 that are pinched toward the rigid member 16 along the medial part 18 of the upper cushion E. The lobes 17 are positioned to bear against the shoulder areas of the occupant to form supports therefor. These lobes may have air cells 19 (see FIGURE 3).

The seat A has been shown as having a pair of pneumatic lobes 20 between which a groove 21 is arranged to give ventilation to the underside of the occupant's legs.

It will be appreciated, of course, that the portable chair seat that has been illustrated may be easily placed in the driver's compartment and removed therefrom, or it may be used by a passenger. Also, it may be used in a home or the like.

I claim:

In a portable chair seat with a back-supporting pneumatic cushion:

(a) a seat made to be placed on a supporting surface;
(b) a backrest secured to the seat and extending thereabove;
(c) an elongated back-supporting pneumatic cushion carried by the backrest to extend transversely thereof and having opposite ends;
(d) the cushion being curved along its longitudinal axis to define concaved upper and convexed lower edges, respectively, and having a midportion disposed at an elevation above the seat in a position to embrace the sacroiliac region of an occupant occupying the seat and pressing rearwardly against the cushion;
(e) the cushion having outer end portions curving upwardly from its midportion and being disposed at higher elevations above the seat than the midportion thereof, with the outer end portions positioned to support the floating ribs area of the occupant when pressing rearwardly against the cushion;
(f) and the backrest being provided with a rigid member arranged rearwardly of the cushion and against which the cushion may be compressed by the occupant, whereby the rebounding pressure of the cushion against the sacroiliac region and the floating ribs area of the occupant may be varied by forward and rearward movement of the occupant.

References Cited in the file of this patent

UNITED STATES PATENTS

| 2,645,274 | Leach | July 14, 1953 |
| 2,942,651 | Binding | June 28, 1960 |

FOREIGN PATENTS

| 435,730 | Great Britain | Sept. 26, 1935 |
| 754,248 | Great Britain | Aug. 8, 1956 |